US012322305B1

(12) United States Patent
Murray, Jr. et al.

(10) Patent No.: US 12,322,305 B1
(45) Date of Patent: Jun. 3, 2025

(54) LAUNDRY SIGN WITH HIDDEN CLOTHES ROD

(71) Applicants: Richard Murray, Jr., Biloxi, MS (US); Eden Murray, Biloxi, MS (US)

(72) Inventors: Richard Murray, Jr., Biloxi, MS (US); Eden Murray, Biloxi, MS (US)

( * ) Notice: Subject to any disclaimer, the term of this patent is extended or adjusted under 35 U.S.C. 154(b) by 199 days.

(21) Appl. No.: 18/125,799

(22) Filed: Mar. 24, 2023

(51) Int. Cl.
*G09F 7/00* (2006.01)
*A47B 46/00* (2006.01)
*G09F 7/22* (2006.01)
*G09F 7/18* (2006.01)

(52) U.S. Cl.
CPC .............. *G09F 7/22* (2013.01); *A47B 46/005* (2013.01); *G09F 2007/1847* (2013.01)

(58) Field of Classification Search
CPC A47B 5/00; A47B 46/005; G09F 7/22; G09F 2007/1847
USPC .......... 108/42, 134; 248/241, 242, 243, 250; 40/727
See application file for complete search history.

(56) References Cited

U.S. PATENT DOCUMENTS

| | | | | |
|---|---|---|---|---|
| 749,670 | A * | 1/1904 | Gardner | A47B 57/045 248/240.4 |
| 2,031,287 | A * | 2/1936 | Swanson | A47B 5/04 248/240.4 |
| 2,116,156 | A * | 5/1938 | Morgan | A47G 25/0685 74/421 A |
| 2,239,225 | A * | 4/1941 | Gordon | A47B 5/04 108/134 |
| 2,407,959 | A | 9/1946 | Littlejohn | |
| 2,669,794 | A * | 2/1954 | Anderson | D06F 81/06 108/134 |
| 3,075,648 | A | 1/1963 | Bereza | |
| 3,086,657 | A * | 4/1963 | Myers | A47G 25/0685 108/29 |
| 5,137,240 | A * | 8/1992 | Van Meter | A47G 25/845 248/240.4 |
| 5,775,655 | A * | 7/1998 | Schmeets | A47B 5/00 108/115 |
| 8,161,990 | B1 | 4/2012 | Coletta et al. | |
| 10,477,960 | B1 * | 11/2019 | Johnson | A47B 5/02 |

FOREIGN PATENT DOCUMENTS

| | | |
|---|---|---|
| WO | WO/98/59104 | 12/1998 |
| WO | WO/2018/131024 A2 | 7/2018 |

OTHER PUBLICATIONS

Etsy. Laundry drying rack hanger. https://www.etsy.com/listing/1338319045/laundry-drying-rack-hanger.

* cited by examiner

*Primary Examiner* — Cassandra Davis
(74) *Attorney, Agent, or Firm* — George L Williamson

(57) ABSTRACT

Method and apparatus for a laundry sign having an artistic rendering on its front surface and a hidden clothes rod on a rear surface wherein the sign is mountable on the wall of a building so that the laundry sign can be moved from a first position against the wall to a second position extending away from the wall. When the laundry sign is extended away from the wall the clothes rod is exposed so that clothes hangers can be attached to the clothes rod and wet clothes can be hung on clothes hangers for drying. Right and left support brackets are placed underneath the sign for mounting the sign on the wall and for allowing the sign to move from a closed position against the wall to an open position extended away from the wall.

8 Claims, 3 Drawing Sheets

LAUNDRY SIGN WITH HIDDEN CLOTHES ROD

BACKGROUND OF THE INVENTION

Field of the Invention

The present invention relates generally to laundry signs and more particularly, is concerned with a laundry sign mountable on a wall having a hidden clothes rod disposed underneath its front surface.

Description of the Related Art

Devices relevant to the present invention have been described in the related art; however, none of the related art devices disclose the unique features of the present invention.

In U.S. Pat. No. 3,075,648 dated Jan. 29, 1963, Bereza disclosed a clothes line cover. In U.S. Pat. No. 2,407,959 dated Sep. 17, 1946, Littlejohn disclosed a clothes line cover. In U.S. Pat. No. 8,161,990 dated Apr. 24, 2012, Coletta, et al., disclosed a clothes line cover apparatus. In International Patent Publication No. WO2018/131024 A2, dated Jul. 19, 2018, Suira, et al., disclosed a clothes-drying device. In International Patent Publication No. WO98/59104 dated Dec. 30, 1998, Beneli, et al., disclosed a clothes line cover.

While these devices may be suitable for the purposes for which they were designed, they would not be as suitable for the purposes of the present invention as hereinafter described. As will be shown by way of explanation and drawings, the present invention works in a novel manner and differently from the related art.

SUMMARY OF THE PRESENT INVENTION

The present invention discloses a laundry sign having an artistic rendering, such as the term "Laundry", written across its front surface which sign is mountable on the wall of a building so that the laundry sign can be moved from a first position against the wall to a second position extending away from the wall and having a clothes rod mounted on its underside so that when the laundry sign is against the wall the clothes rod is hidden but when it is extended away from the wall the clothes rod is exposed so that clothes hangers or the like can be attached to the clothes rod and wet clothes can be hung on the clothes hangers for drying. The laundry sign itself is made of hard material such as wood or plastic or similar material which is relatively inexpensive and readily available. Right and left support brackets are placed underneath the sign for mounting the sign on the wall and for allowing the sign to move from a closed position against the wall to an open position extended away from the wall. In the closed position the laundry sign is parallel to the wall while in the raised or extended position the laundry is perpendicular to the vertical surface of the wall. The brackets are spring-loaded hinges or the like which allow the laundry sign to be moved from the first position against the wall to the second position extended away from the wall. In the first position the laundry sign is retracted against the wall and in the second position the laundry sign is extended away from the wall exposing the clothes rod on its underside or rear surface.

An object of the present invention is to provide a laundry sign which can be hung over the laundry area of a building so as to provide a decorative structure in the laundry area. A further object of the present invention is to provide a laundry sign which can provide a clothes rod when the laundry sign is in the extended position. A further object of the present invention is to provide a clothes rod upon which wet clothes can be hung so that the wet clothes can be air dried. A further object of the present invention is to provide a laundry sign which can be easily operated by a user. A further object of the present invention is to provide a laundry sign having a hidden clothes rod underneath which can be relatively easily and inexpensively manufactured.

The foregoing and other objects and advantages will appear from the description to follow. In the description, reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which.

LIST OF REFERENCE NUMERALS

Figure 1:
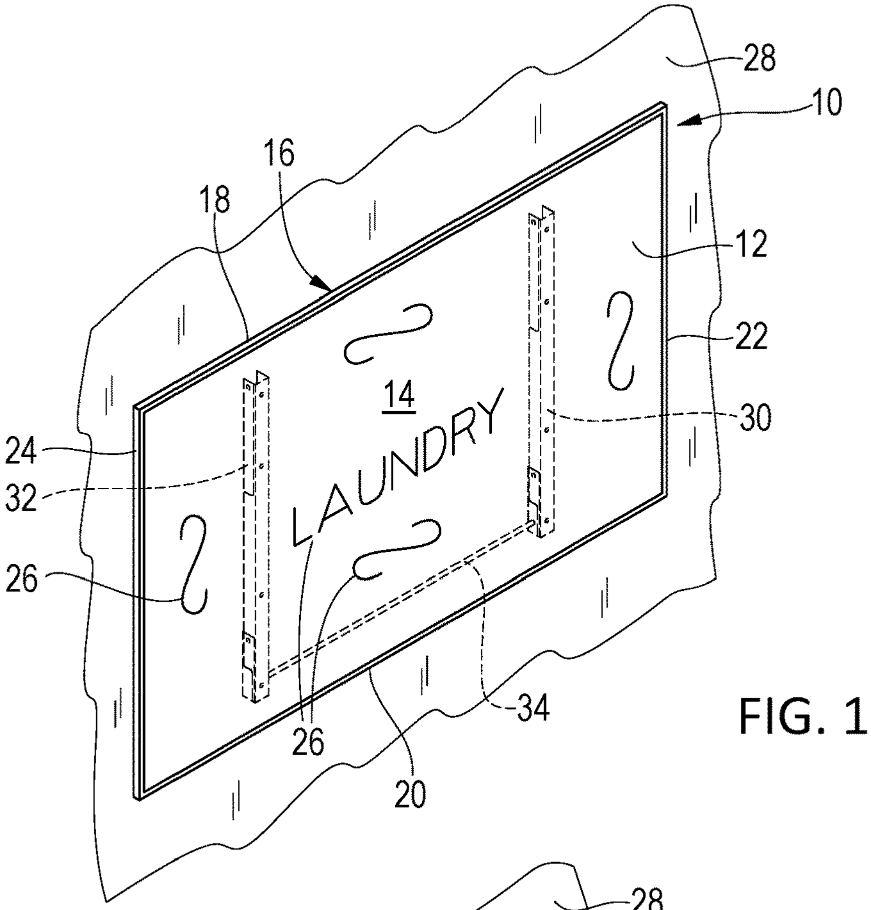
FIG. 1 is a perspective view of the present invention in a retracted position.

With regard to reference numerals used, the following numbering is used throughout the drawings.

10 present invention
12 sign
14 front surface
16 rear surface
18 top edge
20 bottom edge
22 right edge
24 left edge
26 artistic rendering
28 wall
30 right brace
32 left brace
34 clothes rod
35 clothes hanger
36 wall mounted portion
38 sign mounted portion
40 first pivot
42 U-channel
44 support brace
46 first pivot end
48 second pivot end

50 latch lever
52 right arm
54 left arm
56 slot
58 U-channel
60 right flange of arm for rod
61 arm for rod
62 left flange of arm for rod
64 pivot
66 spring
68 first end
70 second end
72 hole
73 fastener
74 base
76 first leg
78 second leg

DESCRIPTION OF THE PREFERRED EMBODIMENT

The following discussion describes in detail at least one embodiment of the present invention. This discussion should not be construed, however, as limiting the present invention to the particular embodiments described herein since practitioners skilled in the art will recognize numerous other embodiments as well. For a definition of the complete scope of the invention the reader is directed to the appended claims. FIGS. 1 through 5 illustrate the present invention wherein an extendable/retractable laundry sign is disclosed and which is generally indicated by reference number 10.

Turning to FIG. 1, therein is shown the present invention 10 having a sign 12 having a flat, planar structure made of a light-weight, hard material such as wood or plastic wherein the sign 12 has a front surface 14 and a rear surface 16 which will be on the opposite side of the front along with a top edge 18 and a bottom edge 20 along with a right edge 22 and a left edge 24. It is expected to have written or otherwise displayed on the front 14 of the sign 12 an artistic rendering 26 which could include the word "laundry" or something similar or other indicia which can be considered to be a decorative element of the present invention 10 and is intended to resemble in outward appearance a conventional picture or laundry sign. The present invention 10 could be mounted on a wall 28 which is expected to be a vertical wall which would be done in the conventional manner inside a building containing the wall. The present invention 10 is mounted on the wall 28 using a right support brace 30 and a left support brace 32 shown on the underside of the sign 12 and also showing a clothes rod 34 extending between the braces. FIG. 1 shows the present invention 10 in a retracted position wherein the front surface 14 of the sign 12 is retracted toward the wall so as to be parallel with the vertical surface of the wall 28.

Figure 2:
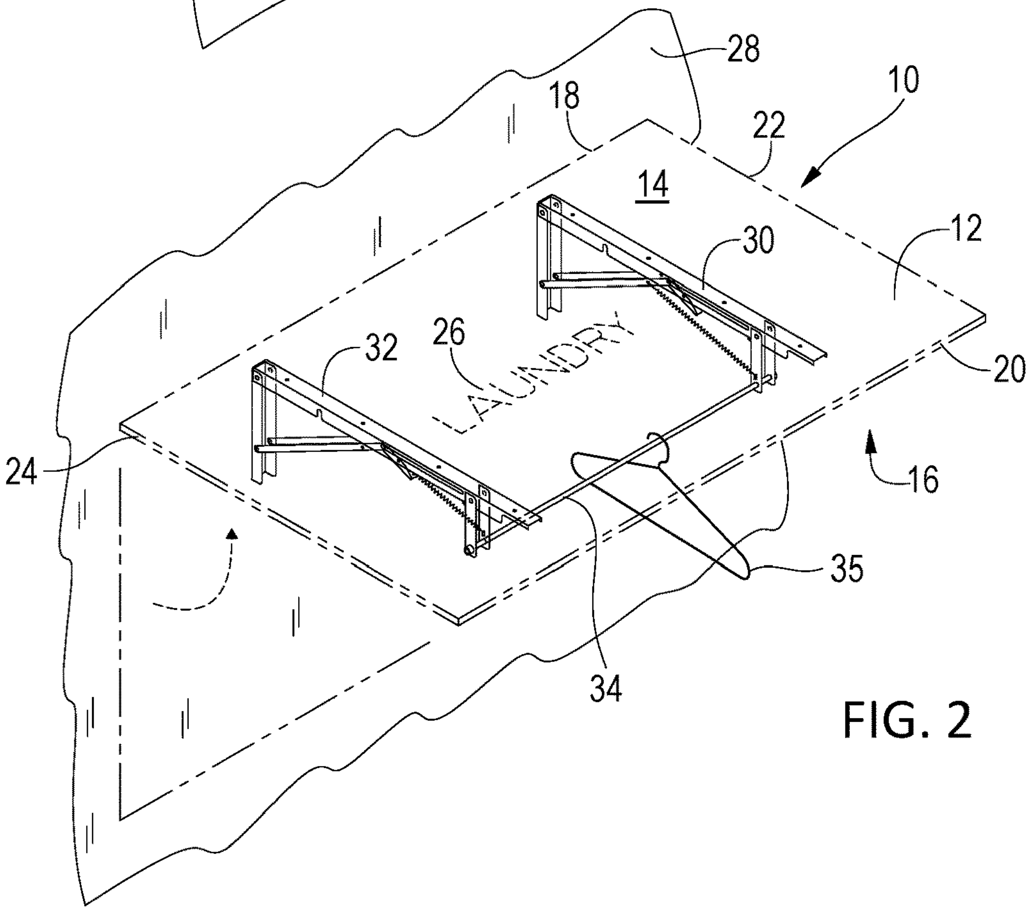
FIG. 2 is a perspective view of the present invention in an extended position.

Turning to FIG. 2, therein is shown the present invention 10 in an extended position away from the wall 28 so that the front surface 14 is disposed in the horizontal plane being perpendicular to the wall 28 so that the clothes rod 34 is visibly exposed on the underside of the sign 12 so that a clothes hanger 35 could be hung on the clothes rod 34 so that any wet clothing hung on the clothes hanger could be exposed to air so the clothes could be air dried. Other previously disclosed elements are also shown.

Figure 3:
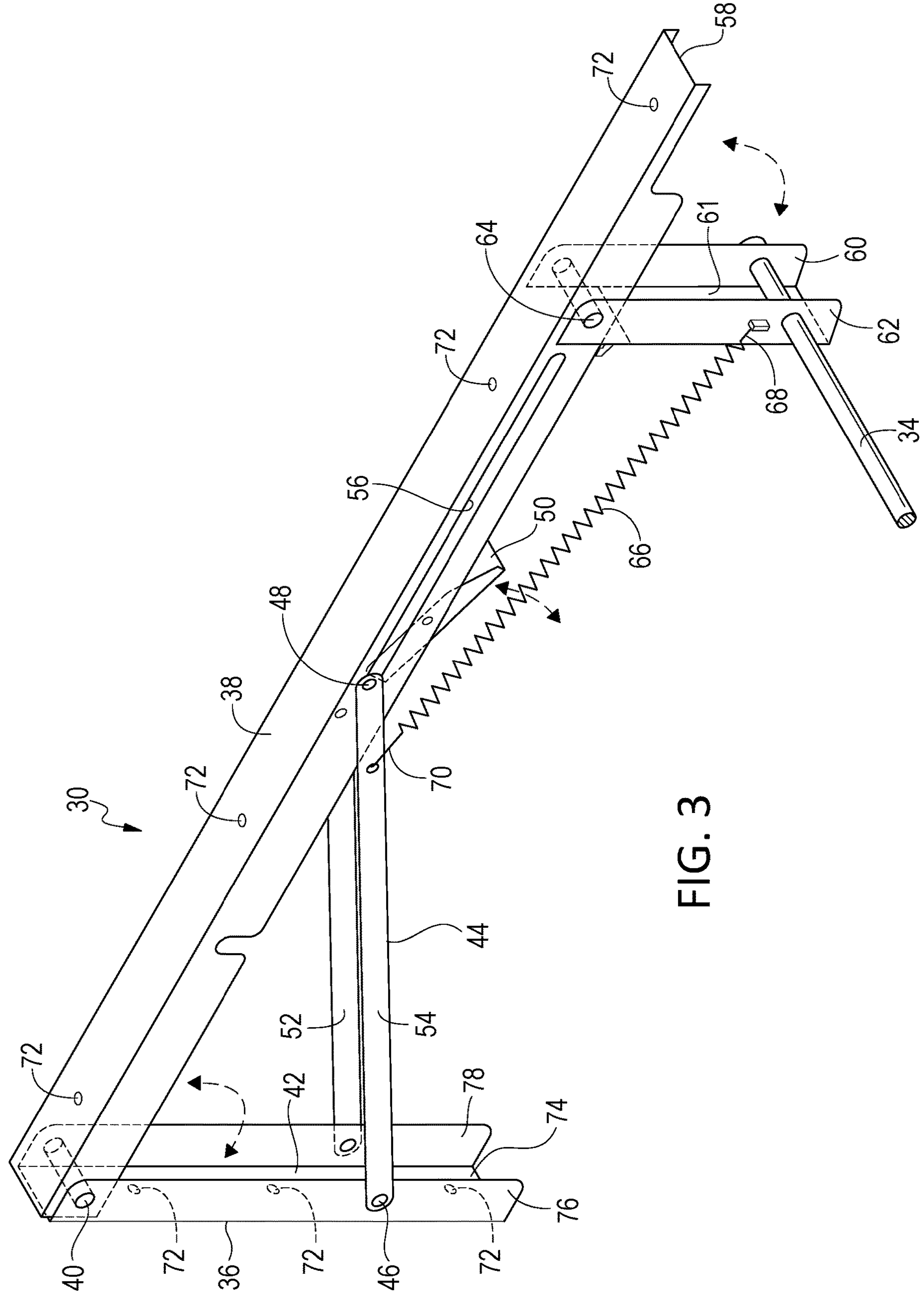
FIG. 3 is a perspective view of one bracket of the present invention.
Figure 4:
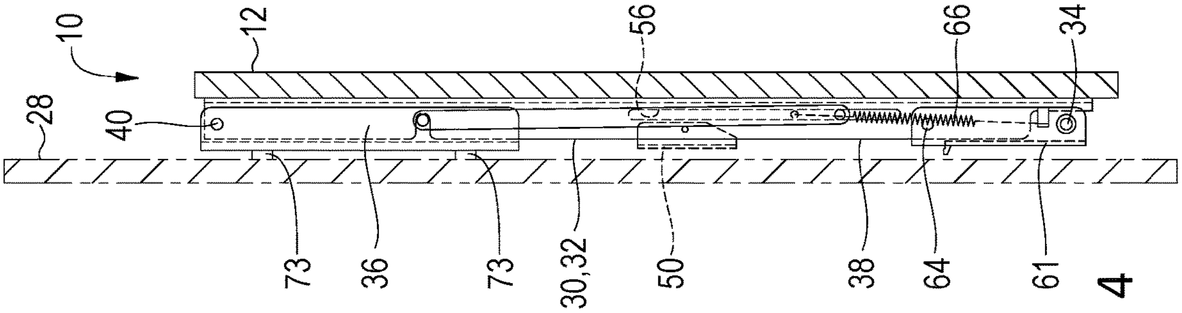
FIG. 4 is a side elevation view of the present invention shown in a retracted position parallel to a wall.

Turning to FIG. 3, therein is shown a perspective view of the right support brace or bracket 30 (FIG. 1 shows the right brace 30 and the left brace 32) including a wall mounted portion 36 along with a sign mounted portion 38 of the bracket mounted on the underside of the sign 12 being pivotally connected at 40 so that the wall mounted portion 36 and the sign mounted portion 38 can be easily moved from a retracted position as shown in FIG. 1 to an extended position as shown in FIG. 2. It can be seen that the wall mounted portion 36 includes a U-channel 42 for receiving therein the sign mounted portion 38 which is sized and shaped to fit therein so that the wall mounted portion 36 can be compactly disposed therein when the sign 12 is in the retracted position as shown in FIG. 1. A support brace 44 is shown having a first end pivotally connected at 46 along with a second end 48 being pivotally connected wherein the first end is connected to the wall mounted portion 36 and the second end is connected to the sign mounted portion 38 so that when the sign 12 is moved to the extended position the brace 44 supports the sign mounted portion 38 in a horizontal position by having pivotable latch lever 50 secure a second end of the brace 44 so that the sign mounted portion 38 is held in the horizontal position. Latch lever 50 has one end for contacting the second end of brace 44 and an opposite for a finger of the operator to push toward an unlocked position and being spring biased toward the latching or locking position so that it makes a clicking sound when it locks into place as shown in FIG. 3. When latch lever 50 is pivoted to the unlocked position then the second end of arm 44 can slide in slot 56 so that sign 12 is moved into the retracted position. Brace 44 comprises a right and left arm 52, 54 which allow the sign mounted portion 38 to fit in between the right and left arms 52, 54. Note that the second end 48 of brace 44 slides in a longitudinal slot 56 disposed in and extending along the sign mounted portion 38. The sign mounted portion 38 of the right brace 30 also has a U-channel 58 within which some of its internal components can be disposed therein. Also shown is the clothes rod 34 which is mounted on right and left flanges 60, 62 of arm 61 which arm 61 is movable on pivot 64 mounted on sign mounted portion 38 and being movable from a downward in-use visible position to an upward closed stowed hidden position being biased by spring 66 to the downward visible position. Arm 61 has a cross-section shape of a U-channel so that it and sign-mounted portion 38 are compatibly sized and shaped so that portions of sign-mounted portion 38 can fit inside arm 61 for stowage and space saving as best shown in FIG. 4. It can be seen that spring 66 has a first end 68 joined to the clothes rod arm 61, and a second end 70 mounted onto the left arm 54 of brace 44 so that the clothes rod 34 is biased toward the downward visible position. Also note the plurality of spaced holes 72 which receive a fastener 73 (see FIGS. 4-5) for attaching the wall mounted portion 36 of the brace 30 to the wall 28 and the sign mounted portion 38 to the sign 12.

Turning to FIG. 4, therein is shown the present invention 10 wherein the sign 12 is shown in its retracted position parallel to the wall 28 as would occur when the clothes rod 34 is in the hidden position. Other previously disclosed elements are also shown.

Figure 5:
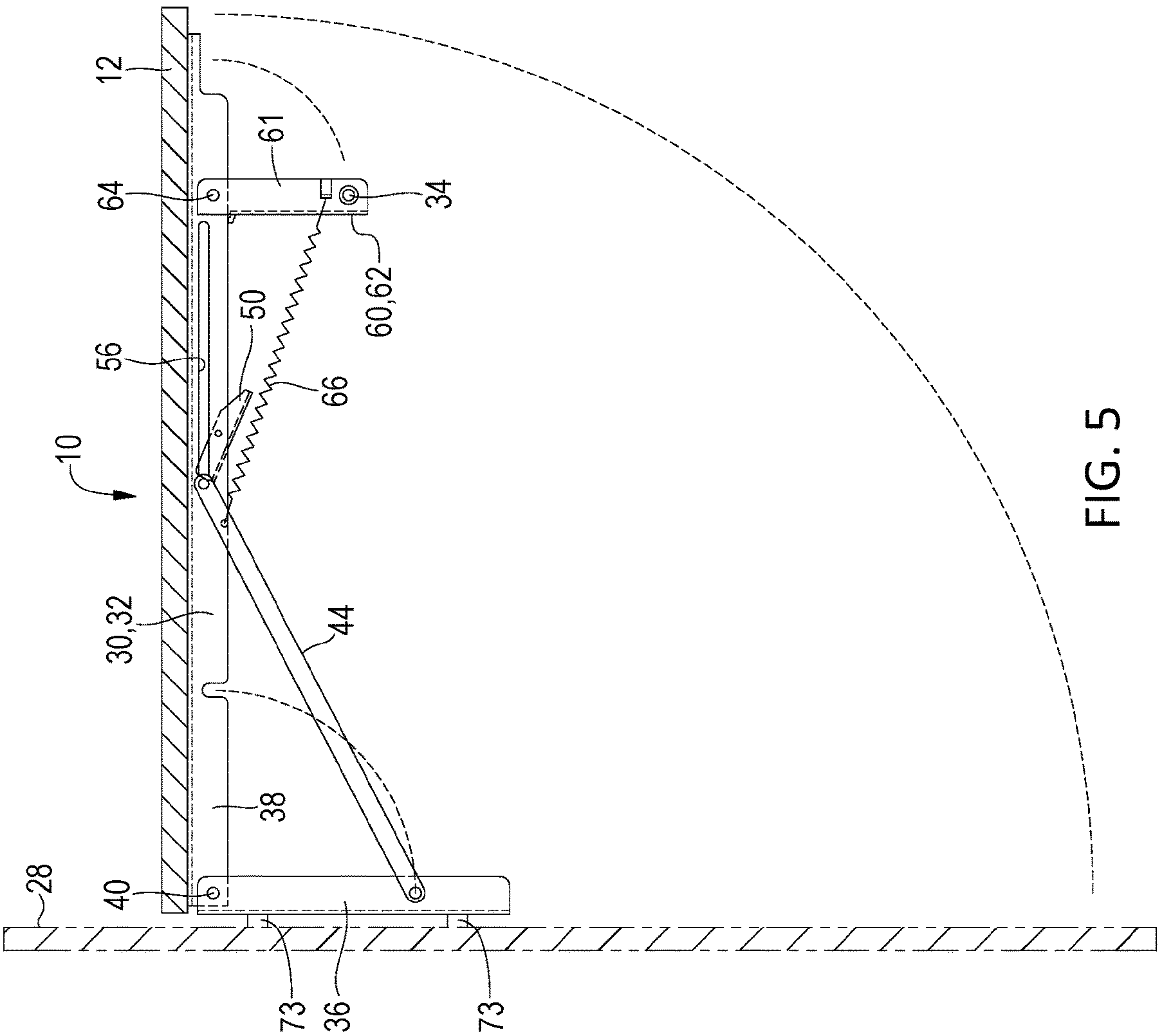
FIG. 5 is a side elevation view of the present invention shown in an extended position perpendicular to a wall.

Turning to FIG. 5, therein is shown the present invention 10 wherein the sign 12 is shown in its extended position perpendicular to the wall 28 as would occur when the clothes rod 34 is in the visible position. Other previously disclosed elements are also shown.

The operational steps of the present invention 10 follow: a) The present invention 10 is to be mounted on a wall 28 appearing like a common conventional picture of picture frame. Next, the user grabs with his hands both bottom corners of the present invention 10 and pulls it outwardly and while rotating it upwardly. The present invention 10 is moved in this manner until it is approximately perpendicular to the wall 28 forming a 90° angle with the wall and until the front surface 14 of the present invention appears to be level. b) Next, the user can hear from each side support bracket 30, 32 a click sound when the latch levers 50 are locked in place making the present invention 10 secured and safe for use. The user should check to be sure that both left and right support latch levers 50 are locked in place so that the present invention 10 is held securely in place before letting go of the present invention. In this position, the springs 66 will maintain tension on the side braces 30, 32 holding the clothes hanging rod 34 in place. c) At this point, the clothes rod 34 of the present invention 10 is ready for use so the wet clothes can be hung up for drying. d) When the user has finished using the clothes rod 34 to dry the clothes, the user can easily return the present invention 10 back to its retracted position against the wall 28 wherein the clothes rod 34 is hidden from view. By using both hands, the user grasps the sign 12 of the present invention 10 with one hand while pressing the latch lever 50 with the other hand to release brackets 30, 32, and doing one side at a time, the tension is released on the bracket. e) Once both levers 50 have been released then the sign 12 of the present invention 10 can then be returned back to its retracted position against the wall 28.

One skilled in the art would understand that a U-channel such as 42, 58 would have a base portion 74 having a pair of parallel walls, legs, or flanges 76, 78 extending away from the base as illustrated in FIG. 3.

By way of summary and by making reference to FIGS. 1-5, the present invention 10 discloses a method of making a laundry sign having a hidden clothes rod 34 for mounting on a wall 28 of a building including pivotally attaching a sign 12 having a planar surface made of sturdy material to a wall, wherein the sign has a retracted position and an extended position (see FIGS. 1 and 2) and a left and right brackets 32, 30 for attaching the sign to the wall, each bracket having a wall mounted portion 36 and a sign mounted portion 38, wherein the wall mounted portion and the sign mounted portion are pivotally joined at 40 to each other so that the sign can be moved between the retracted position and the extended position, wherein the wall mounted portion of each bracket is attached to the wall and the sign mounted portion of each bracket is attached to a rear surface 16 of the sign; and a clothes rod on the rear surface of the sign so that the clothes rod is hidden from view when the sign is in the retracted position and the clothes rod is visible when the sign is in the extended position. Also including a decorative artistic rendering 26 on a front surface 14 of the sign, wherein each bracket has the cross-section shape of a U-channel (see FIG. 3), and wherein the sign mounted portion of each bracket is sized to fit inside each corresponding wall mounted portion of the bracket (see FIG. 4). Also wherein a first end of the wall mounted portion and the sign mounted portion are pivotally joined to permit the sign to move between the retracted position and the extended position and providing a support brace 44 having a first end 46 pivotally joined to each wall mounted portion and a second end 48 pivotally joined to each sign mounted portion to provide vertical support to the sign when it is in the extended position. Also, wherein the sign mounted portion has a longitudinal slot 56 therein, wherein the second end of the support brace slides in the slot to permit the sign to move between the retracted position and the extended position and providing a latch lever 50 on the sign mounted portion for securing the second end of the support brace when the sign is in the extended position. Also, including a spring 66 for biasing the clothes rod toward a position where it is visible to view and including left and right, i.e., a pair, of pivotable arms 61 upon which the clothes rod 34 is attached, wherein the pivotable arms are mounted on the sign mounted portion, wherein the pivotable arms pivot between the downward position and a hidden position as illustrated in FIG. 3, and wherein when each pivotable arm is in the hidden position the sign mounted portion of each bracket is sized and shaped to fit inside the pivotable arm as illustrated in FIG. 4.

Left and right side designations regarding the present invention 10 are interpreted from the view of one standing in front of the sign 12 and facing toward it. Also, lines with arrowheads are sometimes placed on drawings to indicate potential motion or direction of movement of an item illustrated in the drawing.

A feature illustrated in one of the figures may be the same as or similar to a feature illustrated in another of the figures. Similarly, a feature described in connection with one of the figures may be the same as or similar to a feature described in connection with another of the figures. The same or similar features may be noted by the same or similar reference characters unless expressly described otherwise. Additionally, the description of a particular figure may refer to a feature not shown in the particular figure. The feature may be illustrated in and/or further described in connection with another figure.

Elements of processes (i.e. methods) described herein may be executed in one or more ways such as by a human, by a processing device, by mechanisms operating automatically or under human control, and so forth. Additionally, although various elements of a process may be depicted in the figures in a particular order, the elements of the process may be performed in one or more different orders without departing from the substance and spirit of the disclosure herein.

The foregoing description sets forth numerous specific details such as examples of specific systems, components, methods and so forth, in order to provide a good understanding of several implementations. It will be apparent to one skilled in the art, however, that at least some implementations may be practiced without these specific details. In other instances, well-known components or methods are not described in detail or are presented in simple block diagram format in order to avoid unnecessarily obscuring the present implementations. Thus, the specific details set forth above are merely exemplary. Particular implementations may vary from these exemplary details and still be contemplated to be within the scope of the present implementations.

Related elements in the examples and/or embodiments described herein may be identical, similar, or dissimilar in different examples. For the sake of brevity and clarity, related elements may not be redundantly explained. Instead, the use of a same, similar, and/or related element names and/or reference characters may cue the reader that an element with a given name and/or associated reference character may be similar to another related element with the same, similar, and/or related element name and/or reference character in an example explained elsewhere herein. Elements specific to a given example may be described regarding that particular example. A person having ordinary skill in the art will understand that a given element need not be the same and/or similar to the specific portrayal of a related element in any given figure or example in order to share features of the related element.

It is to be understood that the foregoing description may be intended to be illustrative and not restrictive. Many other implementations will be apparent to those of skill in the art upon reading and understanding the above description. The scope of the present implementations should, therefore, be determined with reference to the appended claims, along with the full scope of equivalents to which such claims are entitled.

The foregoing disclosure encompasses multiple distinct examples with independent utility. While these examples have been disclosed in a particular form, the specific examples disclosed and illustrated above are not to be considered in a limiting sense as numerous variations are possible. The subject matter disclosed herein includes novel and non-obvious combinations and sub-combinations of the various elements, features, functions and/or properties disclosed above both explicitly and inherently. Where the disclosure or subsequently filed claims recite "a" element, "a first" element, or any such equivalent term, the disclosure or claims is to be understood to incorporate one or more such elements, neither requiring nor excluding two or more of such elements.

As used herein "same" means sharing all features and "similar" means sharing a substantial number of features or sharing materially important features even if a substantial number of features are not shared. As used herein "may" should be interpreted in a permissive sense and should not be interpreted in an indefinite sense. Additionally, use of "is" regarding examples, elements, and/or features should be interpreted to be definite only regarding a specific example and should not be interpreted as definite regarding every example. Furthermore, references to "the disclosure" and/or "this disclosure" refer to the entirety of the writings of this document and the entirety of the accompanying illustrations, which extends to all the writings of each subsection of this document, including the Title, Background, Brief description of the Drawings, Detailed Description, Claims, Abstract, and any other document and/or resource incorporated herein by reference.

As used herein regarding a list, "and" forms a group inclusive of all the listed elements. For example, an example described as including A, B, C, and D is an example that includes A, includes B, includes C, and also includes D. As used herein regarding a list, "or" forms a list of elements, any of which may be included. For example, an example described as including A, B, C, or D is an example that includes any of the elements A, B, C, and D. Unless otherwise stated, an example including a list of alternatively-inclusive elements does not preclude other examples that include various combinations of some or all of the alternatively-inclusive elements. An example described using a list of alternatively inclusive elements includes at least one element of the listed elements. However, an example described using a list of alternatively inclusive elements does not preclude another example that includes all of the listed elements. An example described using a list of alternatively inclusive elements does not preclude another example that includes a combination of some of the listed elements. As used herein regarding a list, "and/or" forms a list of elements inclusive alone or in any combination. For example, an example described as including A, B, C, and/or D is an example that may include: A alone; A and B; A, B and C; A, B, C, and D; and so forth. The bounds of an "and/or" list are defined by the complete set of combinations and permutations for the list.

Where multiples of a particular element are shown in a FIG., and where it is clear that the element is duplicated throughout the FIG., only one label may be provided for the element, despite multiple instances of the element being present in the FIG. Accordingly, other instances in the FIG. of the element having identical or similar structure and/or function may not have been redundantly labeled. A person having ordinary skill in the art will recognize based on the disclosure herein redundant and/or duplicated elements of the same FIG. Despite this, redundant labeling may be included where helpful in clarifying the structure of the depicted examples.

The Applicant(s) reserves the right to submit claims directed to combinations and sub-combinations of the disclosed examples that are believed to be novel and non-obvious. Examples embodied in other combinations and sub-combinations of features, functions, elements and/or properties may be claimed through amendment of those claims or presentation of new claims in the present application or in a related application. Such amended or new claims, whether they are directed to the same example or a different example and whether they are different, broader, narrower or equal in scope to the original claims, are to be considered within the subject matter of the examples described herein.

We claim:

1. A laundry sign having a hidden clothes rod for mounting on a wall of a building, comprising:

(a) a sign having a planar surface made of sturdy material pivotally attached to a wall, wherein said sign has a retracted position and an extended position;

(b) a left and a right bracket for attaching said sign to said wall, each said bracket having a wall mounted portion and a sign mounted portion, wherein said wall mounted portion and said sign mounted portions are pivotally jointed to each other so that said sign can be moved between said retracted position and said extended position;

(c) wherein said wall mounted portion of each said bracket is attached to said wall and said sign mounted portion of each said bracket is attached to a rear surface of said sign;

(d) a clothes rod disposed on said rear surface of said sign so that said clothes rod is hidden from view when said sign is in said retracted position and said clothes rod is visible when said sign is in said extended position;

(e) wherein each said bracket has the cross-section shape of a U-channel;

(f) wherein said sign mounted portion of each said bracket is sized to fit inside each said corresponding wall mounted portion of said bracket;

(g) wherein a first end of said wall mounted portion and said sign mounted portion are pivotally joined to permit said sign to move between said retracted position and said extended position;

(h) further comprising a support brace having a first end pivotally joined to each said wall mounted portion and a second end pivotally joined to each said sign mounted portion to provide vertical support to said sign when it is in said extended position;

(i) said sign mounted portion having a longitudinal slot therein, wherein said second end of said support brace slides in said slot to permit said sign to move between said retracted position and said extended position; and (j) further comprising a latch lever disposed on said sign mounted portion for securing said second end of said support brace when said sign is in said extended position.

2. The laundry sign of claim 1, further comprising a decorative artistic rendering disposed on a front surface of said sign.

3. The laundry sign of claim 1, further comprising a spring for biasing said clothes rod toward a downward position where it is visible to view.

4. A method of assembling a laundry sign having a hidden clothes rod for mounting on a wall of a building, comprising the steps of:

(a) pivotally attaching a sign having a planar surface made of sturdy material to a wall, wherein the sign has a retracted position and an extended position;

(b) providing left and right brackets for attaching the sign to the wall, each bracket having a wall mounted portion and a sign mounted portion, wherein the wall mounted portion and the sign mounted portion are pivotally joined to each other so that the sign can be moved between the retracted position and the extended position;

(c) wherein the wall mounted portion of each bracket is attached to the wall and the sign mounted portion of each bracket is attached to a rear surface of the sign;

(d) providing a clothes rod on the rear surface of the sign so that the clothes rod is hidden from view when the sign is in the retracted position and the clothes rod is visible when the sign is in the extended position;

(e) wherein each bracket has the cross-section shape of a U-channel;

(f) wherein the sign mounted portion of each bracket is sized to fit inside each corresponding wall mounted portion of the bracket;

(g) wherein a first end of the wall mounted portion and the sign mounted portion are pivotally joined to permit the sign to move between the retracted position and the extended position;

(h) further comprising the step of providing a support brace having a first end pivotally joined to each wall mounted portion and a second end pivotally joined to each sign mounted portion to provide vertical support to the sign when it is in the extended position;

(i) wherein the sign mounted portion has a longitudinal slot therein, wherein the second end of the support brace slides in the slot to permit the sign to move between the retracted position and the extended position; and (j) further comprising the step of providing a latch lever on the sign mounted portion for securing the second end of the support brace when the sign is in the extended position.

5. The method of claim 4, further comprising the step of providing a decorative artistic rendering on a front surface of the sign.

6. The method of claim 4, further comprising the step of providing a spring for biasing the clothes rod toward a downward position where it is visible to view.

7. The method of claim 6, further comprising the step of providing a pair of pivotable arms upon which the clothes rod is attached, wherein the pivotable arms are mounted on the sign mounted portion, wherein the pivotable arms pivot between the downward position and a hidden position.

8. The method of claim 7, wherein when each pivotable arm is in the hidden position the sign mounted portion of each bracket is sized and shaped to fit inside the pivotable arm.

* * * * *